United States Patent
Ganguly et al.

(10) Patent No.: US 11,893,266 B2
(45) Date of Patent: Feb. 6, 2024

(54) METHOD AND APPARATUS FOR ADAPTIVE PAGE MIGRATION AND PINNING FOR OVERSUBSCRIBED IRREGULAR APPLICATIONS

(71) Applicant: UNIVERSITY OF PITTSBURGH-OF THE COMMONWEALTH SYSTEM OF HIGHER EDUCATION, Pittsburgh, PA (US)

(72) Inventors: Debashis Ganguly, Pittsburgh, PA (US); Rami G. Melhem, Pittsburgh, PA (US); Ziyu Zhang, Pittsburgh, PA (US); Jun Yang, Pittsburgh, PA (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 127 days.

(21) Appl. No.: 17/604,975

(22) PCT Filed: Apr. 17, 2020

(86) PCT No.: PCT/US2020/028717
§ 371 (c)(1),
(2) Date: Oct. 19, 2021

(87) PCT Pub. No.: WO2020/226880
PCT Pub. Date: Nov. 12, 2020

(65) Prior Publication Data
US 2022/0214825 A1 Jul. 7, 2022

Related U.S. Application Data

(60) Provisional application No. 62/842,684, filed on May 3, 2019.

(51) Int. Cl.
*G06F 3/06* (2006.01)

(52) U.S. Cl.
CPC ............ *G06F 3/0653* (2013.01); *G06F 3/061* (2013.01); *G06F 3/0647* (2013.01); *G06F 3/0673* (2013.01)

(58) Field of Classification Search
CPC ...... G06F 3/0653; G06F 3/061; G06F 3/0647; G06F 3/0673
See application file for complete search history.

(56) References Cited

U.S. PATENT DOCUMENTS

| 6,453,408 B1 * | 9/2002 | Stuart Fiske ........... G06F 12/08 711/E12.071 |
| 7,102,646 B1 | 9/2006 | Rubinstein et al. |

(Continued)

FOREIGN PATENT DOCUMENTS

| DE | 102013022168 A1 | 9/2014 |
| WO | 2014101820 A1 | 7/2014 |

OTHER PUBLICATIONS

Schmeisser et al. "Parallel, Distributed and GPU Computing Technologies in Single-particle Electron Microscopy," Acta Crystallographica Section D Biological Crystallography ISSN 0907-4449, Oct. 10, 2008, [retrieved on Jun. 15, 2020]. Retrieved from the Internet: <URL: https://www.ncbi.nlm.nih.gov/pmc/articles/PMC2703572/> pp. 659-671.

(Continued)

*Primary Examiner* — Edward J Dudek, Jr.
(74) *Attorney, Agent, or Firm* — Philip E. Levy; Eckert Seamans Cherin & Mellott, LLC

(57) ABSTRACT

A method of managing data during execution of an application for use in a system that includes a host memory, a near memory, and a near device associated with the near memory. The application uses a working set of data that is distributed between the far memory and the near memory. The method includes counting a number of times that the near device accesses a unit of the working set of data from the far (Continued)

memory, determining whether the number of times exceeds a dynamically changing access counter threshold, wherein the dynamically changing access counter threshold is calculated dynamically based on a static threshold that is set for the system, and responsive to determining that the number of times exceeds the dynamically changing access counter threshold, migrating the unit of data from the far memory to the near memory.

31 Claims, 5 Drawing Sheets

(56) References Cited

U.S. PATENT DOCUMENTS

| | | | |
|---|---|---|---|
| 7,457,922 | B2 | 11/2008 | Shen |
| 8,904,068 | B2 | 12/2014 | Durant et al. |
| 9,430,400 | B2 | 8/2016 | Duluk, Jr. |
| 9,563,562 | B2 | 2/2017 | Rowlands et al. |
| 9,575,892 | B2 | 2/2017 | Deming et al. |
| 2011/0040744 | A1 | 2/2011 | Haas et al. |
| 2012/0047312 | A1 | 2/2012 | Nathuji et al. |
| 2014/0281264 | A1 | 9/2014 | Duluk, Jr. et al. |
| 2014/0281299 | A1 | 9/2014 | Duluk, Jr. et al. |
| 2016/0117131 | A1 | 4/2016 | Karamcheti et al. |
| 2016/0210251 | A1 | 7/2016 | Nale et al. |
| 2017/0123796 | A1 | 5/2017 | Kumar et al. |
| 2018/0024932 | A1* | 1/2018 | Nachimuthu ........ G02B 6/3897 711/213 |
| 2018/0150256 | A1 | 5/2018 | Kumar et al. |
| 2019/0138437 | A1* | 5/2019 | Bennett ............... G06F 12/0246 |

OTHER PUBLICATIONS

Zheng, Tianhao, David Nellans, Arslan Zulfiqar, Mark Stephenson, and Stephen W. Keckler. "Towards high performance paged memory for GPUs." In 2016 IEEE International Symposium on High Performance Computer Architecture (HPCA), pp. 345-357. IEEE, 2016.

Li, Chen, Rachata Ausavarungnirun, Christopher J. Rossbach, Youtao Zhang, Onur Mutlu, Yang Guo, and Jun Yang. "A Framework for Memory Oversubscription Management in Graphics Processing Units." (2019).

* cited by examiner

METHOD AND APPARATUS FOR ADAPTIVE PAGE MIGRATION AND PINNING FOR OVERSUBSCRIBED IRREGULAR APPLICATIONS

CROSS-REFERENCE TO RELATED APPLICATIONS

This application is a U.S. National Stage Application under 35 U.S.C. § 371 of International Application No. PCT/2020/028717, filed on Apr. 17, 2020, entitled "METHOD AND APPARATUS FOR ADAPTIVE PAGE MIGRATION AND PINNING FOR OVERSUBSCRIBED IRREGULAR APPLICATIONS", which claims priority under 35 U.S.C. § 119(e) from U.S. Provisional Patent Application No. 62/842,684, filed on May 3, 2019, entitled "DELAYED PAGE MIGRATION USING ADAPTIVE AND DYNAMIC ACCESS COUNTER THRESHOLD IN UNIFIED VIRTUAL MEMORY FOR GENERAL PURPOSE GPUS." the contents of which are incorporated herein by reference.

GOVERNMENT CONTRACT

This invention was made with government support under grant #1725657 awarded by the National Science Foundation (NSF). The government has certain rights in the invention.

BACKGROUND OF THE INVENTION

1. Field of the Invention

The present invention pertains to heterogeneous non-uniform memory access (NUMA) systems made of discrete and disparate memory modules with heterogeneity in their performance characteristics and storage capacity (e.g., a near memory that is performance-optimized but capacity-constrained, and a far memory that is capacity-optimized, but performance-constrained) such that performance can be quantified by access latency and bandwidth. More specifically, the present invention pertains to a method and apparatus for adaptively migrating and pinning data (e.g., pages) for oversubscribed irregular applications. The present invention has applicability in heterogeneous NUMA system cases, such as a multi-socket system, a CPU-GPU heterogeneous system, or a heterogeneous hybrid memory system, where the near and far memories are connected to one another by an off-chip, off package data-fabric or interconnect (e.g., PCIe, xGMI, etc.).

2. Description of the Related Art

Today, heterogeneity in memory technology and core types is ubiquitous in systems starting from hand-held smartphones to large supercomputers and commodity cloud platforms. For example, Oak Ridge National Laboratory's Titan supercomputer incorporates graphics processing units (GPUs) and Intel Corporation's Xeon Phi™ co-processors alongside traditional central processing units (CPUs). Similarly, Amazon Web Services (AWS), one of the largest cloud providers, offers instances of CPU-GPU platforms built with CPUs from Intel Corporation and GPUs from NVIDIA Corporation. The union of high thermal design power (TDP) processors in heterogeneous systems offers new performance opportunities for applications. For example, while serial code sections can run efficiently on ILP-optimized CPU processors, parallel code with fine grained data parallelism benefits from running on accelerators such as GPUs, resulting in aggregate savings of millions of dollars in large-scale systems.

While some of these heterogeneous systems may share a single homogeneous pool of physical memory between CPUs and GPUs, discrete GPUs connected with x86 processors via peripheral component interconnect express (PCIe) dominate the marketplace. As the number of scalar cores and SIMT (Single Instruction Multiple Threads) units in GPUs continued to grow, memory bandwidth also scaled proportionately to keep the compute resources busy. However, GPU memory capacity remains relatively small as compared to the capacity of CPU-attached memory. For example, while CPUs are likely to continue using cost and capacity-optimized DRAM (e.g., DDR4, LPDDR4) technology, GPUs are moving towards using capacity-limited, but bandwidth-optimized, on-package memory such as GDDR5, High Bandwidth Memory (HBM) and Wide-IO2 (WIO2). Due to the large differences in bandwidth and capacity of the individual memory modules, memory management becomes challenging with respect to the system design and programmability of discrete CPU-GPU systems.

Due to the existence of discrete physical memory modules, application programmers traditionally had to explicitly call memory copy APIs to copy pre-initialized data over the relatively slow PCIe bus to the GPU's physical memory before launching GPU kernels. This upfront memory transfer is an important aspect while quantifying GPU performance, because for long-running GPU kernels, this bandwidth-optimized bulk-transfer amortizes the migration overhead. However, relatively smaller GPU memory capacity restricts the effective working sets of the GPU programs. As a result, the onus of memory management falls squarely on the programmers. Application developers are forced to tile their data for migration and painstakingly launch GPU kernels over multiple iterations. This burden has been considerably relaxed by the introduction of Unified Virtual Memory (UVM). To date, stand-alone PCIe-attached GPUs are treated as slave accelerators. The runtime, loaded as a set of kernel modules in the host operating system, is the key to tap into the computation capabilities of a GPU. Both Advanced Micro Devices, Inc. (AMD) and NVIDIA Corporation introduced software-managed runtimes which provide the illusion of unified memory space by providing a virtual memory pointer shared between CPU and GPU. With the assistance from hardware page-faulting and migration engines, UVM automates the migration of data in and out of the GPU memory even upon GPU-memory over-subscription.

Moreover, over the years, modern day symmetric multiprocessor (SMP) systems have become more complex in their structure and component designs. Now, they are typically made of multiple cache coherent non-uniform memory access (CC-NUMA) zones where each NUMA zone comprises of a socket, the processors within it, and the attached physical memory module. While a processor within a NUMA zone can freely access the memory from another NUMA zone to take advantage of the aggregate memory capacity and bandwidth, it comes at the cost of non-uniform access latency. To mitigate the performance imbalance and benefit from data locality, researchers have explored the idea of page placement and pinning in traditional CC-NUMA systems. Earlier works mostly focused on placing data and processes in close proximity. Acknowledging the fact that it is typically better for processes to service memory requests from their own NUMA zone, operating systems like LINUX expose the system topology and memory latency information using System Resource Affinity Table (SRAT) and System Locality Information Table (SLIT). Discovering this information, applications can allocate and place physical memory pages using malloc and mmap calls. Another body of work considers sharing patterns, interconnect congestion, and even queuing delay within the memory controller as metrics to design page and process placement policies. Page placement and pinning also becomes a crucial consideration for hybrid and hierarchical memory systems consisting of capacity-optimized non-volatile memory (NVM) alongside latency-optimized small DRAM modules. Several works have studied the performance peculiarities of NVM in particular read/write latency disparity and focused to balance performance needs with power consumptions.

In recent years, discrete CPU-GPU heterogeneous systems are moving away from the PCIe interface. By layering coherence protocols on top of physical link technologies (e.g. NVLink, Hypertransport etc.), these systems achieve high bandwidth and low latency between the NUMA pools attached to the GPU and CPU respectively. As a result, CPU-GPU heterogeneous systems are closely resembling the traditional CC-NUMA and even hierarchical hybrid memory systems. Today, GDDR5 is the most common bandwidth-optimized memory technology used with discrete GPUs. Due to the high data rates (per-pin data rate up to 7 Gbps), GDDR5 requires significant energy per access and in turn cannot scale into high-capacity multi-rank memory modules. CPU-attached DRAM modules (DDR4, LPDDR4), on the other hand, can provide similar latency at a much lower energy requirement per access, but fail to provide high data rates (only 3.2 Gbps per pin). Traditionally, operating systems characterize NUMA zones based on the difference in respective memory access latency and further assume that these NUMA zones will be symmetric in bandwidth and power characteristics. However, in the context of CPU-GPU heterogeneous systems, this assumption clearly breaks down. The situation is further exacerbated as GPU-runtime is unaware of the potential impact of these differences in memory characteristics on performance and energy requirements of the running applications. The disaggregation of memory into on- and off-package pools and significant variation in energy requirements, bandwidth, and latency between the discrete memory pools are two primary factors motivating the necessity to revisit page placement and pinning decisions in the context of CPU-GPU Unified Memory. Moreover, with heterogeneous computing, certain phases of computation are pinned to either the CPU or GPU. Unlike traditional NUMA-aware SMP systems, processes are not migrated to the data they are operating on to mitigate performance imbalance. As a result, it is the runtime's responsibility to decide where the memory pages are to be pinned and when they are to be migrated in case of heterogeneous CPU-GPU systems. The goal of a robust page placement and pinning strategy is to abstract the technical properties of on- and off-package memory into power and performance characteristics on which an optimization decision can be made.

While CPUs are generally more performance sensitive to memory system latency rather than other memory characteristics, due to their massive TLP, GPUs can gracefully handle long memory latencies, and instead are sensitive to memory bandwidth. One prior art approach (Bin Wang, Bo Wu, Dong Li, Xipeng Shen, Weikuan Yu, Yizheng Jiao, and Jeffrey S. Vetter, *Exploring Hybrid Memory for GPU Energy Efficiency Through Software-Hardware Co-Design*, Proceedings of the 22nd International Conference on Parallel Architectures and Compilation Techniques, 93-102, IEEE Press, 2013) explored compiler analysis to identify near-optimal data placement across kernel invocations for their heterogeneous memory (mixed NVM-DRAM based) system to ensure improved power efficiency. In the context of discrete CPU-GPU heterogeneous system, another prior art approach (Neha Agarwal, David Nellans, Mark Stephenson, Mike O'Connor, and Stephen W Keckler. *Page Placement Strategies for GPUS Within Heterogeneous Memory Systems*, ACM SIGPLAN Notices, volume 50, pages 607-618, ACM, 2015) proposed a bandwidth-aware (BW-AWARE) page placement policy that maximizes GPU throughput by balancing page placement across the memories based on the aggregate memory bandwidth available in a system. They enhanced BW-AWARE by a compiler-based profiling mechanism that furnishes programmers with data-structure access information and in turn allows programmers to annotate programs to provide hints about memory placement. They further studied the trade-offs and considerations in relying on hardware cache-coherence mechanisms versus using software page migration to optimize the performance of memory-intensive GPU workloads. They showed that virtual address-based program locality to enable aggressive memory prefetching combined with bandwidth balancing is required to maximize performance.

However, none of the above prior art works consider the presence of a prefetcher in CPU-CPU unified memory and its impact on memory over-subscription. Beyond the peculiarities of memory characteristics and asymmetry in bandwidth, access latency, capacity, and power consumption, the memory access pattern of GPU workloads plays a vital role while deciding page placement and pinning. Neha Agarwal, David Nellans, Mark Stephenson, Mike O'Connor, and Stephen W Keckler. *Page Placement Strategies for GPUS Within Heterogeneous Memory Systems*, ACM SIGPLAN Notices, volume 50, pages 607-618, ACM, 2015, showed that over 60% of the memory bandwidth stems from within only 10% of the application's allocated pages. This is due to the fact that distinct ranges of physical addresses appear to be clustered as hot or cold (based on the aggregate access frequency) for a wide range of irregular data-intensive workloads. Further, migrating a cold page can cause serious thrashing of a heavily accessed or hot page, which is the primary cause of oversubscription overhead for irregular data-intensive applications with sparse, random, and seldom access over large cold data sets.

SUMMARY OF THE INVENTION

In one embodiment, a method of managing data during execution of an application is provided for use in a system that includes a host memory, a near memory, and a near device associated with the near memory. The application uses a working set of data that is distributed between the far memory and the near memory. The method includes counting a number of times that the near device accesses a unit of the working set of data from the far memory, determining whether the number of times exceeds a dynamically changing access counter threshold, wherein the dynamically changing access counter threshold is calculated dynamically based on a static threshold that is set for the system, and responsive to determining that the number of times exceeds the dynamically changing access counter threshold, migrating the unit of data from the far memory to the near memory.

In another embodiment, a system for executing an application is provided. The system includes a near device, a near memory coupled to the near device, and a far memory coupled to the near memory. The near device is configured to execute the application using a working set of data in a condition where the working set of data is distributed between the near memory and the far memory. In addition, the system is configured for counting a number of times that the near device accesses a unit of the working set of data from the far memory, determining whether the number of times exceeds a dynamically changing access counter threshold, wherein the dynamically changing access counter threshold is calculated dynamically based on a static threshold that is set for the system, and responsive to determining that the number of times exceeds the dynamically changing access counter threshold, migrating the unit of data from the far memory to the near memory.

In yet another embodiment, an apparatus for use in a system for executing an application is provided, wherein the application uses a working set of data, and wherein the working set of data is distributed between a near memory and a far memory that are coupled to one another. The apparatus includes a processing unit configured to: (i) count a number of times that a near device accesses a unit of the working set of data from the far memory; (ii) determine whether the number of times exceeds a dynamically changing access counter threshold, wherein the dynamically changing access counter threshold is calculated dynamically based on a static threshold that is set for the system; and (iii) responsive to determining that the number of times exceeds the dynamically changing access counter threshold, migrate the unit of data from the far memory to the near memory.

DETAILED DESCRIPTION OF EXEMPLARY EMBODIMENTS

Figure 1A:
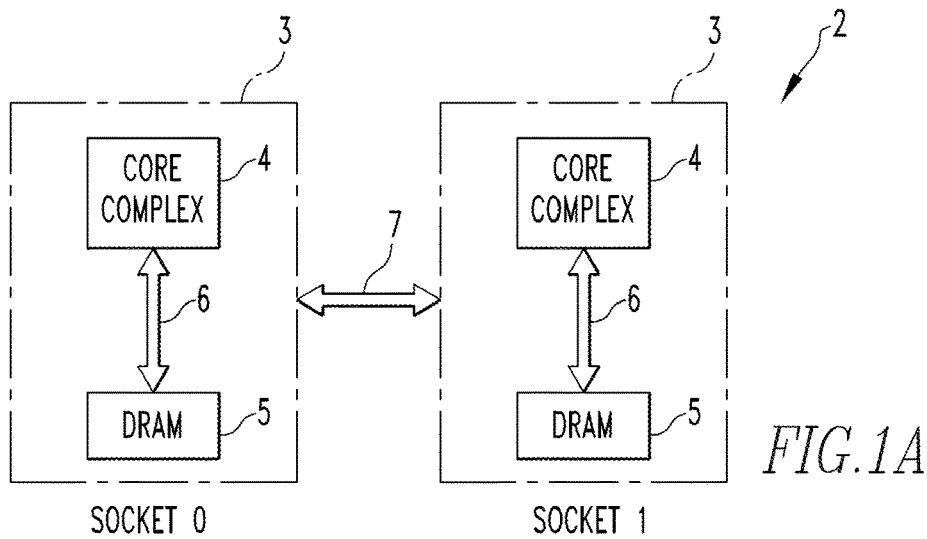
FIGS. 1A, 1B and 1C are schematic diagrams of heterogeneous NUMA systems according to various exemplary embodiments of the disclosed concept in which the page migration and pinning algorithm of the disclosed concept may be implemented.

As used herein, the singular form of "a", "an", and "the" include plural references unless the context clearly dictates otherwise.

As used herein, the statement that two or more parts or components are "coupled" shall mean that the parts are joined or operate together either directly or indirectly, i.e., through one or more intermediate parts or components, so long as a link occurs.

As used herein, the term "number" shall mean one or an integer greater than one (i.e., a plurality).

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

The disclosed concept will now be described, for purposes of explanation, in connection with numerous specific details in order to provide a thorough understanding of the subject innovation. It will be evident, however, that the disclosed concept can be practiced without these specific details without departing from the spirit and scope of this innovation.

Unified Memory offers a "single-pointer-to-data" model wherein both host and device see a unified view of the virtual address space. However, at any given time, only one physical copy of the data is maintained either on the host or the device memory.

In one prior art methodology, known commonly as "first touch migration," the data is initialized in the host memory, and on every first access to a page by the device, the corresponding page table entry in the host is invalidated, the data is migrated to the device memory, and a new entry is created in the device page table.

In another prior art methodology, known commonly as "zero-copy access," the physical allocation is hard-pinned to the host memory. This means that pages are never copied from host to device memory. Rather, the device accesses data remotely over cache-coherent PCI-e by directly migrating it to the device cache line. Remote zero-copy access has lower latency than classic Direct Memory Access (DMA), but also suffers from the lower bandwidth of the PCIe interconnect. This is why zero-copy access is often introduced for applications with seldom and sparse access to very large data sets.

NVIDIA Corporation's CUDA® 9.0 parallel computing platform and programming model that implements a UVM offers the ability to provide user hints to the Unified Memory subsystem about the usage pattern. More specifically, the cudaMemAdviseSetAccessedBy flag allows the device to establish direct mapping to the host memory and avoid migrations. Further, the preferred location of a memory allocation can be set to the host memory to avoid migration using cudaMemAdviseSetPreferredLocation. However, the pages in the host memory are soft-pinned because, based on runtime heuristics, pages can be migrated to the local from the far memory.

Moreover, NVIDIA Corporation's Volta® GPUs and IBM Corporation's Power9® device introduced a new hardware based page level access counter. In these systems, if an allocation is advised to be soft-pinned to the host memory, then the memory is not copied directly at the first-touch by the device. Rather, the migration from the preferred location of host memory to the device memory is delayed based on a static access counter threshold, $t_s$, of the hardware based page level access counter. Under this scheme, if a page is accessed to read data for a number of times that crosses the value of $t_s$ (as configured in the driver), the data is then copied to the device memory. On the other hand, on write access, the page is invalidated in the host page table and exclusively copied to the device memory irrespective of the access frequency.

The disclosed concept overcomes many of the shortcomings of the above described methodologies and systems. As described in detail herein, the disclosed concept provides a user-agnostic page placement and pinning methodology for data-intensive, irregular workloads in heterogeneous NUMA system cases. The method of the disclosed concept leverages a hardware based access counter register (e.g., the counter present in IBM Power9® and Volta® V100 systems described above) and extends the static threshold-based delayed migration strategy to create a heuristic that determines a dynamic access threshold for page migration. In the exemplary embodiment, the dynamic access threshold is derived as a response to the memory occupancy, and page access and thrashing frequency. It dynamically strikes a balance between latency optimized direct access to remote host memory and bandwidth-optimized local memory for cold and hot data structures respectively.

The memory access pattern of a GPU application depends on the fine-grained parallelism and inherent memory access characteristics. Different patterns can react differently to memory over-subscription. As a result, over-subscription overhead of a workload heavily depends on the corresponding memory access pattern. One known methodology (Qi Yu, Bruce Childers. Libo Huang, Cheng Qian, and Zhiying Wang, *A Quantitative Evaluation of Unified Memory in GPUs*, The Journal of Supercomputing, pages 1-28, 2019) provides a quantitative evaluation and comprehensive analysis of Unified Memory in GPUs. This methodology profiles workload execution on a simulation platform to identify six representative classes of memory access patterns for various general-purpose applications. Another known methodology (Chen Li, Rachata Ausavarungnirun, Christopher J Rossbach, Youtao Zhang, Onur Mutlu, Yang Guo, and Jun Yang, *A Framework for Memory Oversubscription Management in Graphics Processing Units*, Proceedings of the Twenty-Fourth International Conference on Architectural Support for Programming Languages and Operating Systems, pages 49-63. ACM, 2019) also classifies GPU applications in three categories—1) regular applications without data sharing, 2) regular applications with data sharing, and 3) irregular applications. Still another known methodology (Martin Burtscher, Rupesh Nasre, and Keshav Pingali. *A Quantitative Study of Irregular Programs on GPUs*, 2012 IEEE International Symposium on Workload Characterization (IISWC), pages 141-151, IEEE, 2012) performs a quantitative study to categorize a set of irregular applications based on their memory and control flow irregularity and input dependence. The Li et al methodology just described employs a counter in each streaming multi-processor's (SM's) load/store unit to sample the number of coalesced memory accesses and determine the memory access pattern of the executing workload. Upon detecting the memory access pattern, the runtime chooses between proactive eviction, memory-aware throttling, and capacity compression to address the challenge with memory over-subscription.

Unlike the works just described, however, the disclosed concept provides an extension to the runtime for access pattern detection that does not rely on either intrusive profiling techniques or on any hardware extension. Rather, the disclosed concept leverages the hardware-based access counter and access cycle information already available with the runtime engine to determine memory access patterns and can transparently apply specific memory management techniques.

The disclosed concept has applicability in heterogeneous NUMA system cases, such as a multi-socket NUMA system, a CPU-GPU heterogeneous system, or a heterogeneous hybrid memory system, where the near and far memories are connected by an off-chip, off package data-fabric or interconnect (e.g., PCIe, xGMI, etc.). For example, in one particular non-limiting exemplary embodiment/use case, the disclosed concept may be implemented in the NVIDIA/ CUDA® CPU-GPU system described elsewhere herein. It will be understood, however, that the disclosed concept is vendor agnostic and applies to any discrete CPU-GPU system. Other example venders that provide systems with a discrete accelerator attached to a CPU via and interconnect in which the disclosed concept may be implemented include, without limitation, Mythic Inc., GraphCore Ltd, Groq, Inc., Cerebras Systems, Inc., Advanced Micro Devices, Inc., Intel Corporation. More generally, the disclosed concept is not limited to just systems that employ a discrete accelerator attached to a CPU, bit instead applies to any heterogeneous NUMA system comprising discrete and disparate memory modules with heterogeneity in their performance characteristics and storage capacity. A number of such exemplary systems are described below.

FIG. 1A is a schematic diagram of a heterogeneous NUMA system according to one exemplary embodiment of the disclosed concept. The heterogeneous NUMA system shown in FIG. 1A is in the form of a multi-socket NUMA system 2 that includes two homogenous memory modules. In particular, multi-socket NUMA system 2 includes a pair of packages, each labeled with reference 3. As seen in FIG. 1A, each package 3 includes a core complex 4 connected to an off-chip volatile memory module 5 (e.g., DRAM with DDR technology) via an off-chip, on-package data fabric 6. The packages 3 are commonly known as sockets. The two packages 3 are connected via an off-chip, off-package data fabric 7, such as Intel's QuickPath Interconnect (QPI), formerly known as Common System Interface (CSI) or HyperTransport (HT), formerly known as Lighting Data Transport (LDT). Multi-socket NUMA system 2 results in different performance characteristic while accessing on-package or on-socket memory modules or memory near to a given core complex in contrast to accessing off-package/ socket memory module far from the core complex via off-package data-fabric.

Figure 1B:
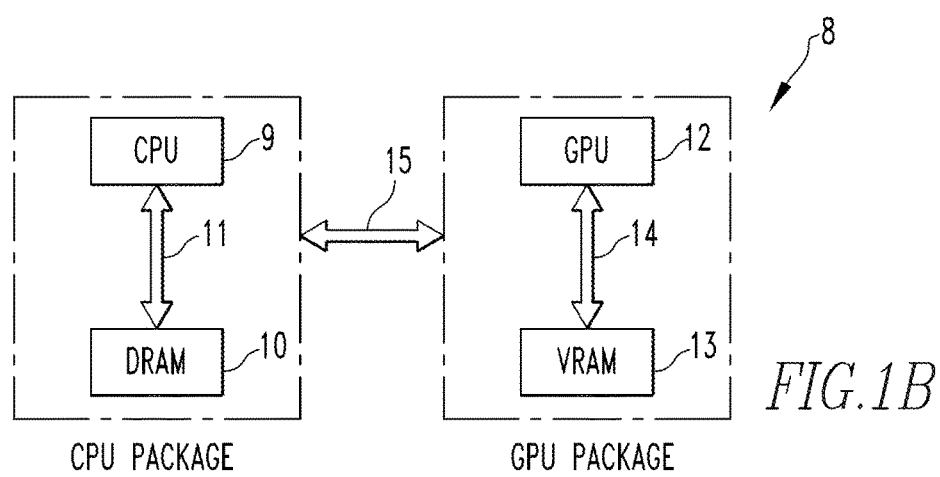

FIG. 1B is a schematic diagram of a heterogeneous NUMA system according to another exemplary embodiment of the disclosed concept. The heterogeneous NUMA system shown in FIG. 1B is in the form of a CPU-GPU heterogeneous system 8 composed of heterogeneous memory modules. In particular, as seen in FIG. 1B, CPU complex 9 is connected to a DRAM module 10 (e.g., DDR4) via an off-chip, on-package data fabric 11, and GPU compute unit 12 is connected to a VideoRAM 13 (e.g., GDDR5, HBM) via an off-chip, on-package data fabric 14. The CPU and GPU packages are connected an via off-chip, off-package data fabric 15, such as NVLINK, PCIe, xGMI, etc. This results in a non-uniform memory access by GPU 12 between accessing local VRAM 13 vs far DRAM 10 over off-chip, off-package data fabric 15.

Figure 1C:
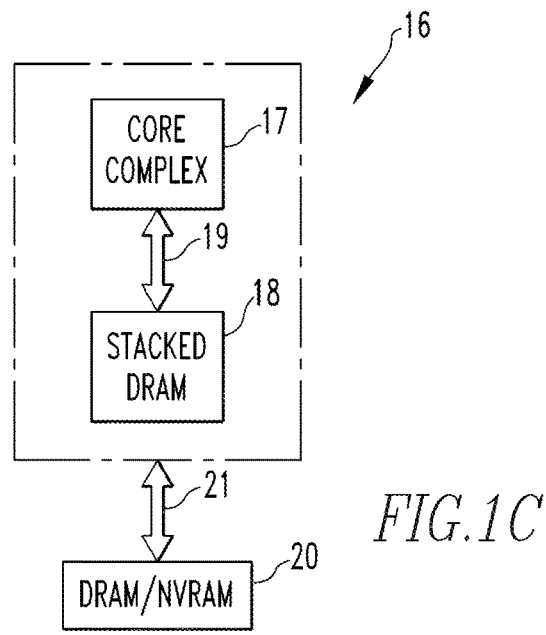

FIG. 1C is a schematic diagram of a heterogeneous NUMA system according to yet another exemplary embodiment of the disclosed concept. The heterogeneous NUMA system shown in FIG. 1C is in the form of a heterogeneous hybrid memory system 16 composed of a single socket system with heterogeneous memory modules. An example of such a system is Intel Corporation's Knights Landing (KNL) system. As seen in FIG. 1C, heterogeneous hybrid memory system 16 includes a package having a core complex 17 that is connected stacked DRAM 18 by an off-chip, on-package data fabric 19. In addition, the package including core complex 17 and stacked DRAM 18 are connected to an off-package volatile memory 20, such as DRAM or non-volatile memory (NVRAM) such as PCM, by and off-chip, off-package data fabric 21.

Thus, the various heterogeneous NUMA systems just described each include (i) a number of processing units (e.g., core complexes 4, CPU 9, GPU 12, and core complex 17), (ii) a high-bandwidth, performance-optimized but capacity-constrained near memory (e.g., one of the DRAMs 5, VRAM 13 and stacked DRAM 18), and (iii) a low bandwidth, performance constrained but capacity optimized far memory (e.g., one of the DRAMs 5, DRAM 10, and off-package volatile memory 20). In addition, in these various exemplary embodiments, one of the processing units (e.g., one of the core complexes 4, CPU 9, GPU 12, or core complex 17) is configured to execute an irregular application that utilizes a working set that is split between the near memory and the far memory. Furthermore, one of the processing units (e.g., one of the core complexes 4, CPU 9, GPU 12, or core complex 17) is also configured to implement a method of adaptively migrating and pinning data (e.g., pages) for oversubscribed irregular applications according to the disclosed concept described herein. In addition, one of the processing units (e.g., one of the core complexes 4, CPU 9, GPU 12, or core complex 17) is provided with a hardware based page level access counter similar to that found in NVIDIA Corporation's Volta® GPUs or IBM Corporation's Power9® device. The significance of this feature is explained below. Various particular exemplary embodiments/implementations of the disclosed concept will now be described in detail below.

An effective memory management strategy to deal with device memory oversubscription requires a thorough understanding of the memory access patterns of the workloads. Analysis of the memory access patterns of various GPGPU workloads reveals that workloads can be broadly categorized into the following patterns: 1) regular, with dense, sequential, repetitive memory access, and 2) irregular, with sparse, seldom access. Analysis by runtime profiling shows that fault-based migration under oversubscription waits for long latency write backs in the case of regular applications. On the other hand, the oversubscription overhead in irregular applications is due to excessive page thrashing, which is further exacerbated by the operation of a prefetcher.

Figure 2A:
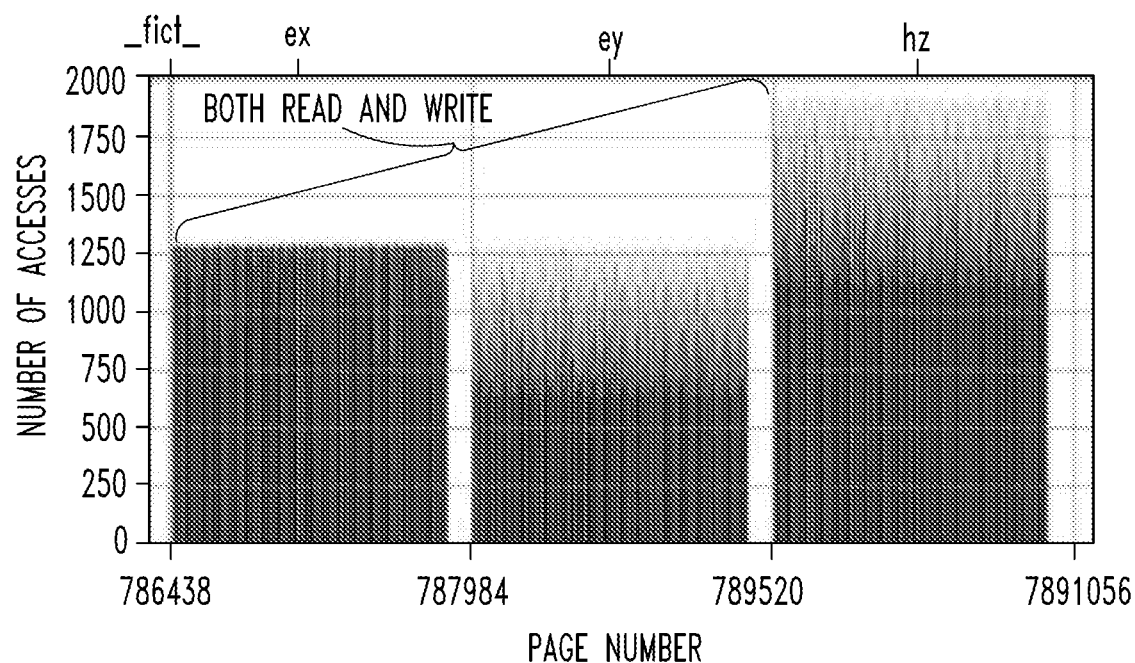
FIGS. 2A and 2B show the distribution of page access frequency of different data structures over the entire execution period of two benchmarks, fdtd and sssp.
Figure 2B:
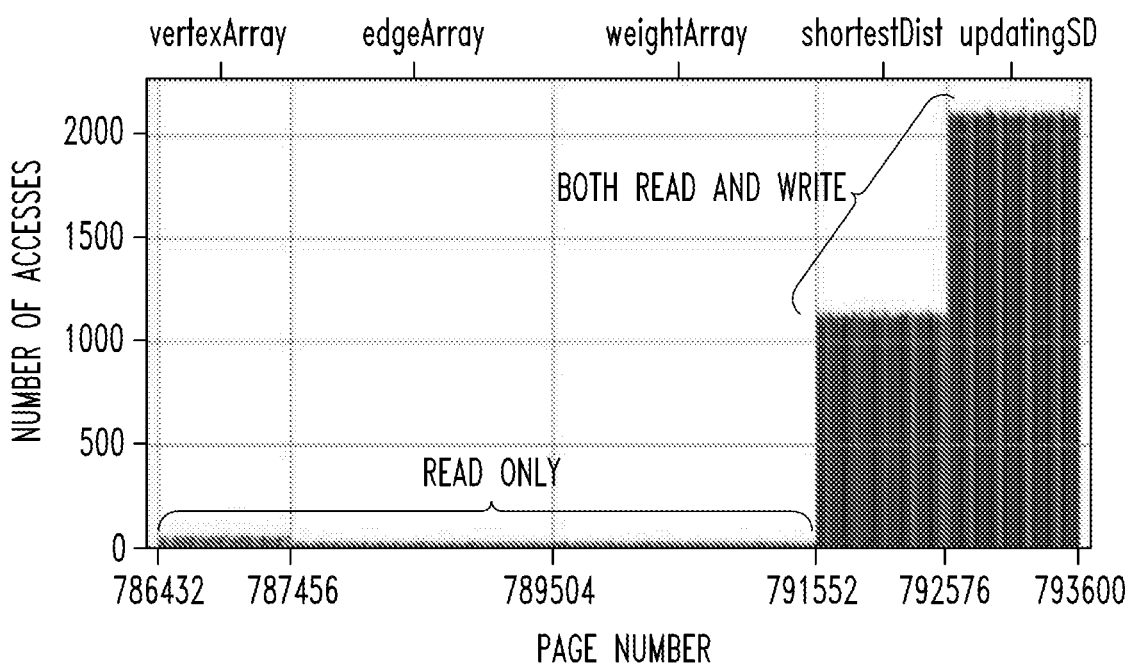

FIGS. 2A and 2B show the distribution of page access frequency of different data structures over the entire execution period of two benchmarks, fdtd and sssp. Memory pages are characterized based on the type of access—read only, and both read and in-place write. FIG. 2A shows that in fdtd, most of the pages in the allocations are accessed at the same frequency over the entire execution time. A very few pages equally spaced over the allocation boundary are accessed a lot more than the rest of the pages. On the other hand, FIG. 2B shows an entirely different characteristics for sssp. It can be seen that few data-structures are more heavily accessed than the others, leading to a cluster of hot and cold pages over the entire memory set. Moreover, the read-only data-structures are cold and the pages in hot data-structures are both read from and written to. This shows that for irregular applications, a small fraction of memory footprint corresponds to the higher share of bandwidth.

Figure 3A:
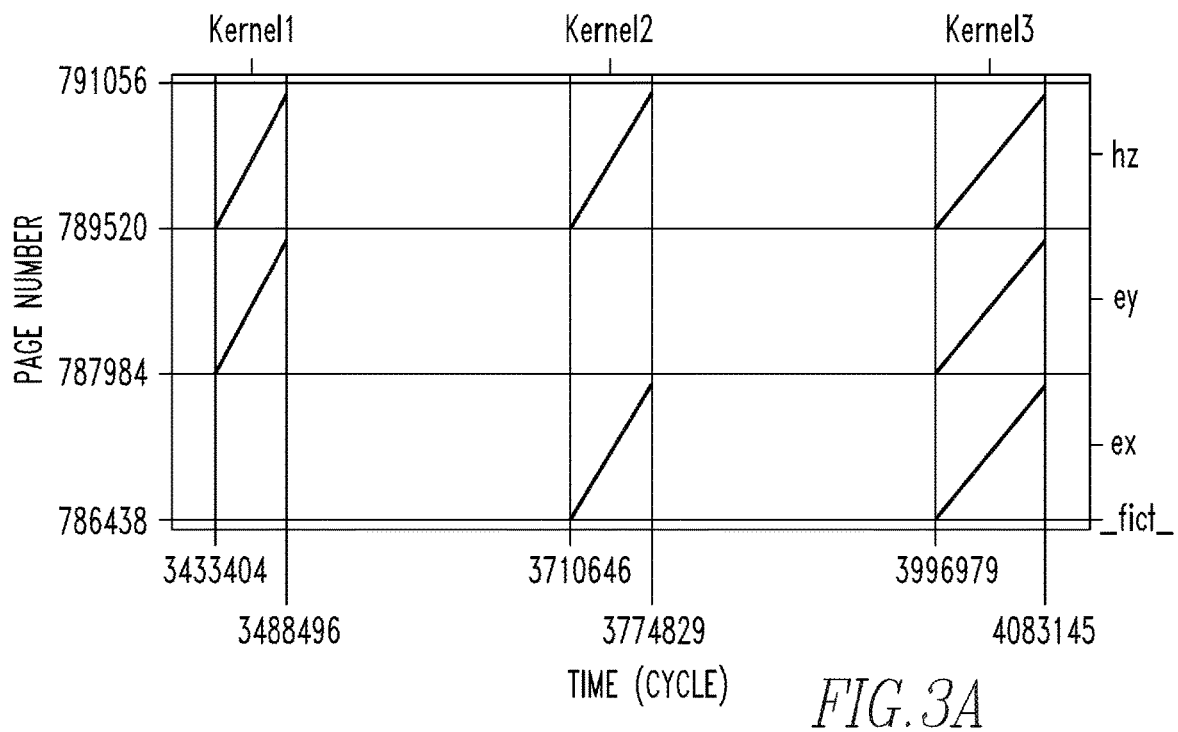
FIGS. 3A and 3B show the memory access pattern of fdtd for two different iterations.
Figure 3B:
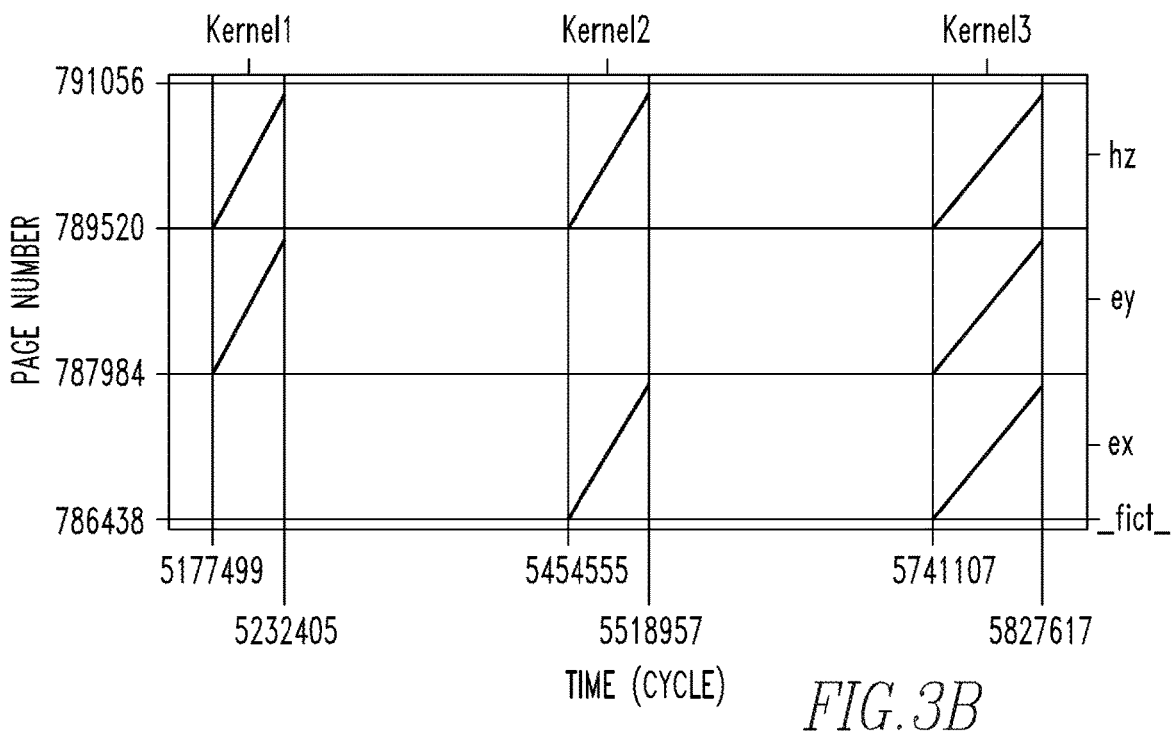

FIGS. 3A and 3B show the memory access pattern of fdtd for two different iterations, 2 and 4, respectively. The horizontal axis represents time in cycles and the primary vertical axis shows the page numbers accessed at a given cycle. It can be seen that the memory access pattern is fairly constant over the two different iterations. Moreover, in every iteration, each allocated data structure is accessed linearly. This explains the access frequency distribution of fdtd in FIG. 2A. Therefore, fdtd can be categorized as a regular application. Regular applications typically show dense, sequential access repeated over multiple iterations. backprop, hotspot, and srad are other examples of GPU benchmarks that can also be categorized as regular applications as they exhibit similar memory access pattern.

Figure 3C:
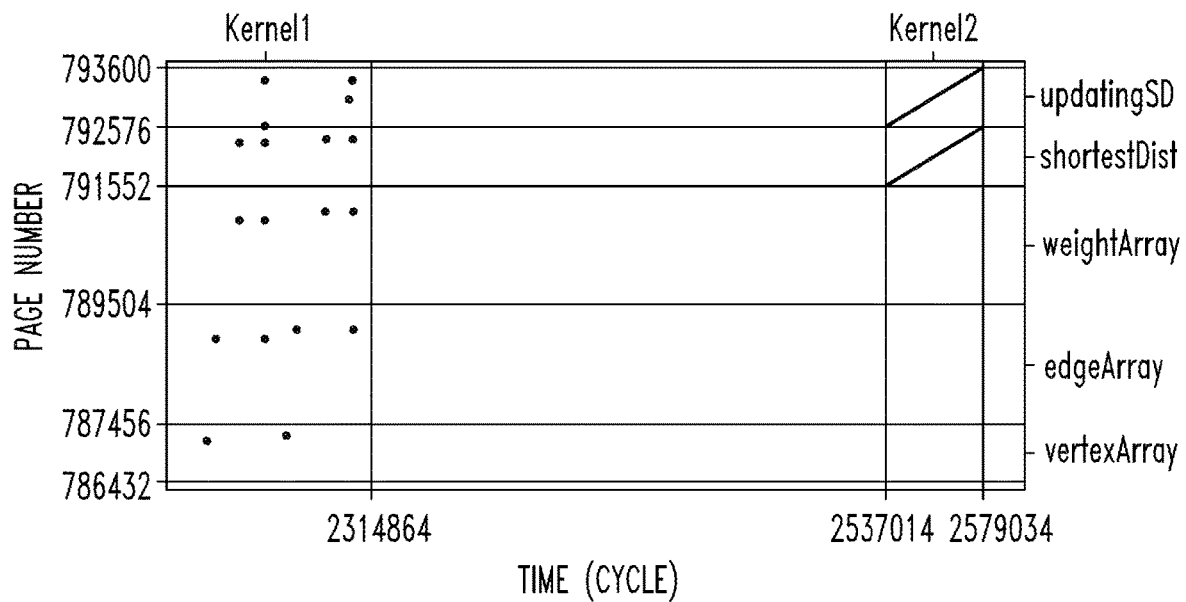
FIGS. 3C and 3D show the memory access pattern of sssp for two different iterations.
Figure 3D:
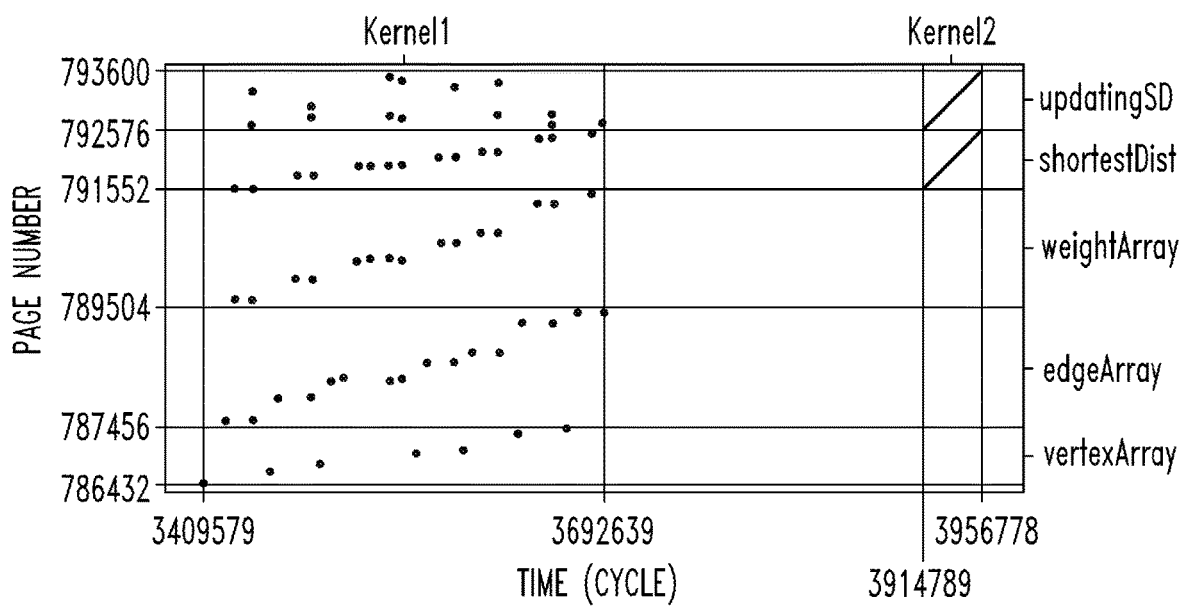

On the other hand, FIGS. 3C and 3D show the memory access pattern of sssp for two different iterations, 3 and 5, respectively. Firstly, kernel1 exhibits sparse memory access over different data structures. Moreover, the memory pages accessed over different iterations also varies drastically in virtual address space. kernel2 shows sequential and dense access over two data structures in every iteration. This justifies the cluster of hot and cold data structures in sssp as shown in FIG. 2B. Hence, sssp can be categorized as an irregular applications. In general, irregular applications exhibit dense sequential access on hot data structures and sparse, random access on cold data structures. bfs, nw, and ra are other benchmarks that also fall under the same category.

Irregular applications with sparse memory access can highly benefit from both remote zero-copy access and access counter based delayed migration. As in Unified Memory, fault based migration triggers additional prefetching of neighbor pages, and under strict memory budget can exacerbate the situation causing crippling impacts on performance. Delayed migration or no-copy can improve performance for irregular applications by reducing the number of page thrashings. However, for regular applications with dense, sequential access, zero-copy is a bad option. Although the remote zero-copy model offers low latency of access, migrating data in bulk to the local memory and then accessing it enjoys the benefits of bandwidth optimized local network. Moreover, larger migration using a prefetcher improves PCI-e bandwidth utilization and reduces the number of far-faults in general. Similarly, having a static access counter based threshold for delayed migration incurs additional overhead of remote access because for dense sequential access, the data is eventually migrated to the local memory upon crossing the threshold.

In one aspect, the disclosed concept as described herein provides dynamic access-counter threshold based delayed data migration. This particular memory management strategy is motivated based on the following observations: 1) a higher percentage of PCIe bandwidth is consumed by a small percentage of the total memory pages, 2) migrating pages of cold data structures causes eviction of pages of hot data structures for irregular applications, 3) data migrations due to page thrashing over low bandwidth PCIe contribute to memory oversubscription overhead, 4) current state-of-the-art solutions are not satisfactory to all workloads, as zero-copy access and delayed migration can hurt performance of regular applications, although proven to be useful for irregular workloads, and 5) an effective solution to address device memory oversubscription must rely on user-hints based on extensive recognition of memory usage and access patterns.

This disclosed concept thus introduces an adaptive runtime heuristic that is programmer-agnostic, as it requires no advice to the memory subsystem from
the application developer. Further, the new hardware feature of a page-level access counter is leveraged to build the solution of the disclosed concept. Thus, the methodology of the disclosed concept demands no hardware modifications and is solely based on pragmatic modification to the relevant driver (e.g., the NVIDIA driver in one exemplary implementation).

In current delayed migration solutions, pages are always migrated only after crossing a static access counter threshold. This means regular applications with dense memory access end up incurring the overhead of remote memory access before ultimately migrating the pages to the local memory. Moreover, when there is no memory constraint, it is always beneficial to migrate the data to the device memory and access it locally. This is because a tree-based prefetcher can considerably improve PCIe bandwidth utilization and in turn reduce the number of far-faults. Also, local memory is bandwidth optimized and thus guarantees better performance than fragmented remote access.

Accordingly, an effective solution should be able to decide how to eliminate the overhead of remote access for no memory oversubscription and regular applications in general. To this end, a dynamic threshold for delayed migration is provided by the disclosed concept. The heuristic of the disclosed concept is driven by the following equation:

$$t_d = \begin{cases} t_s * \frac{\text{Num. of allocated pages}}{\text{Total num. of pages}} + 1, & \text{if no oversubscription} \\ t_s * (r+1) * p, & \text{otherwise} \end{cases}$$

where $t_s$=the static access counter threshold, r=the number of round trips or number of times evicted, Num. of allocated pages is the number of pages allocated to the device, and p=a multiplicative migration penalty. This formula therefore basically gives current occupancy of the device memory before oversubscription, wherein current occupancy=Num of allocated pages on the device memory of total working set/Total device memory size in number of pages.

Thus, in this aspect of the disclosed concept, $t_s$ (static threshold) is a kernel parameter that is set for the whole system. $t_d$(dynamic threshold) is calculated based on $t_s$. It is calculated dynamically based on the current state of memory for every basic block (e.g., (4 KB) requested for migrating in the device memory from the host memory. When the device memory has not reached oversubscription, then $t_d$ is determined based on the current occupancy of the memory [=(total allocated pages)/(total number of memory pages)] and $t_s$. After the oversubscription is reached, then $t_s$ is calculated based on $t_s$, a penalty (another configurable system wide parameter), and also taking in consideration the number of round trips, a state maintained per eviction granularity.

Furthermore, the number of round trips or number of times evicted are, in the exemplary embodiment, kept per eviction granularity. For example, eviction granularity may be a standard 2 MB, so the round trip is maintained at that level. A round trip or number of times evicted may thus be described as follows. Initially, data resides in the host/far memory. On a first request to the page by the device, it is migrated to the device/near memory from the host/far memory. Then after oversubscription, this page can be evicted out from the device memory and written back to the host memory. Again, if the device needs the page back in the future, it can again be migrated back to device memory from the host memory. This device→host→device is a roundtrip. As will be appreciated, this is also same as the number of times a page is evicted out from the device memory to the host memory.

Thus, in the disclosed concept, the dynamic threshold, $t_d$, grows adaptively in response to the size of free space in the device memory, starting from 1 and growing to the driver configured static threshold, $t_s$. For example, consider the static threshold, $t_s$, is configured in the driver as 8. If currently less than 10% of device memory is allocated, then the dynamic threshold is derived as 1 from the equation above. This means every first touch will cause page migration. Similarly, the dynamic access counter threshold will be same as the static threshold of 8 just before reaching the full capacity of device memory, and 9 upon oversubscription. The goal of the framework, here, is to tame down the aggression of the prefetcher by delaying the page migration as the memory starts filling up to its maximum capacity. Use cases involving no memory oversubscription and regular applications benefit from this mechanism compared to delayed migration based on a static threshold.

The equation above also addresses the situations involving memory oversubscription. The framework is driven by the intuition that under memory oversubscription, cold pages should be soft-pinned to the host memory and only hot pages should be copied to device memory. This is because hot pages can benefit from bandwidth optimized local memory access and the sparse and seldom access to cold pages can benefit from low latency of remote access without contributing to the strict local memory budget. The equation above also introduces a multiplicative penalty for migration under oversubscription, p, that is configurable as a module parameter to the relevant driver. With p=2 and $t_s$=8, the pages are migrated after $16^{th}$ access after oversubscription. This helps reduce the amount of page thrashing. Moreover, the framework keeps count of the number of round trips or the number of times a certain chunk of memory is evicted, which is denoted as r in the equation above. For example, if a given chunk of memory is evicted twice, then the dynamic threshold of migration for that memory chunk will be derived as 48. The intuition behind this heuristic is that the more a page is thrashed, the harder it should be pinned to the host memory. Thus, the heuristic controls hardness (/softness) of page pinning and helps achieve the concept of host-pinned zero-copy allocation for highly thrashed memory pages. If no user-hint to explicitly soft-pin pages is provided, the runtime (e.g., CUDA runtime) provides automatic detection of page thrashing and in turn throttling of page migration. However, this is achieved by maintaining lists of thrashed pages indexed by host or device identifier and grouped in blocks of virtual addresses. Prefetching and page migrations are throttled consulting this list. First of all, maintaining such list of pages comes with high space and implementation overhead. Secondly, it also breaks the semantics of a tree-based prefetcher prefetching in, for example, the multiple of 64 KB basic blocks. The present inventor has demonstrated that disabling the hardware prefetcher can cause orders of magnitude performance degradation and thus the current solution to handle page thrashing in the NVIDIA driver is not optimal. Further, "zero-copy" allocations cause hard-pinning of pages as compared to soft-pinning realized by the heuristic of the disclosed concept. As a result, the framework of the disclosed concept can adaptively respond to the changing phases of memory access over the course of execution. In other words, the framework of the disclosed concept allows a set of hot pages in previous iterations to evolve and become cold and vice versa.

The framework of the disclosed concept also extends page replacement strategy leveraging to the same access counters. Known naïve Least Recently Used (LRU) page replacement cannot differentiate a set of cold pages from a set of hot pages. As a result, it may end up evicting highly referenced hot pages in the process of migrating a cold page, and thus defeat the objective of hard-pinning hot pages to the device memory and cold pages to the host memory. The framework of the disclosed concept leverages the access counters to sort the list of 2 MB large pages in the LRU list such that cold pages are prioritized over hot pages for eviction in irregular applications. Thus, it incorporates a simplified Least Frequently Used (LFU) scheme. However, with linear sequential access in regular applications, where pages are accessed with almost the same frequency, the framework automatically falls back to the LRU policy. Read-only pages are also prioritized as eviction candidates. This is because on write access, hot pages are migrated exclusively to the device memory irrespective of their access counter. So, one would prefer to keep the write pages in local memory as much as possible.

Typically, the access counters are maintained at the page granularity of the system in question (e.g., Volta® GPUs). However, known tree-based prefetchers (e.g., in NVIDIA-UVM module) migrate data in multiple of 64 KB basic blocks based on the page faults relayed from the graphics memory management unit (GMMU). This leads to the optimization of maintaining access counters at a 64 KB basic block level instead of a 4 KB page granularity. This not only reduces the overhead of maintaining access counters in newer generation GPUs, it is also functionally more meaningful as the prefetch granularity is 64 KB. In one exemplary implementation, framework of the disclosed concept uses 32bits access registers. The lower 27bits are used for access counters and most significant 5bits are kept to keep track of round trip time or r. This provides the opportunity to maintain a large value for access frequency and to realize a historic counter. The access counters in known devices (e.g., Volta® GPUs) only keep track of remote accesses. In comparison, the framework of the disclosed concept maintains count of both device-local and remote accesses. This provides a historic view of accesses and helps differentiate hot pages from cold pages over larger iterations. When the counter for one of the pages reaches the maximum value (for either the round trip counters or the access counters), the framework halves the corresponding counters of all the pages instead of resetting them entirely. This helps maintain the relative view of hotness over multiple allocations.

Figure 4:
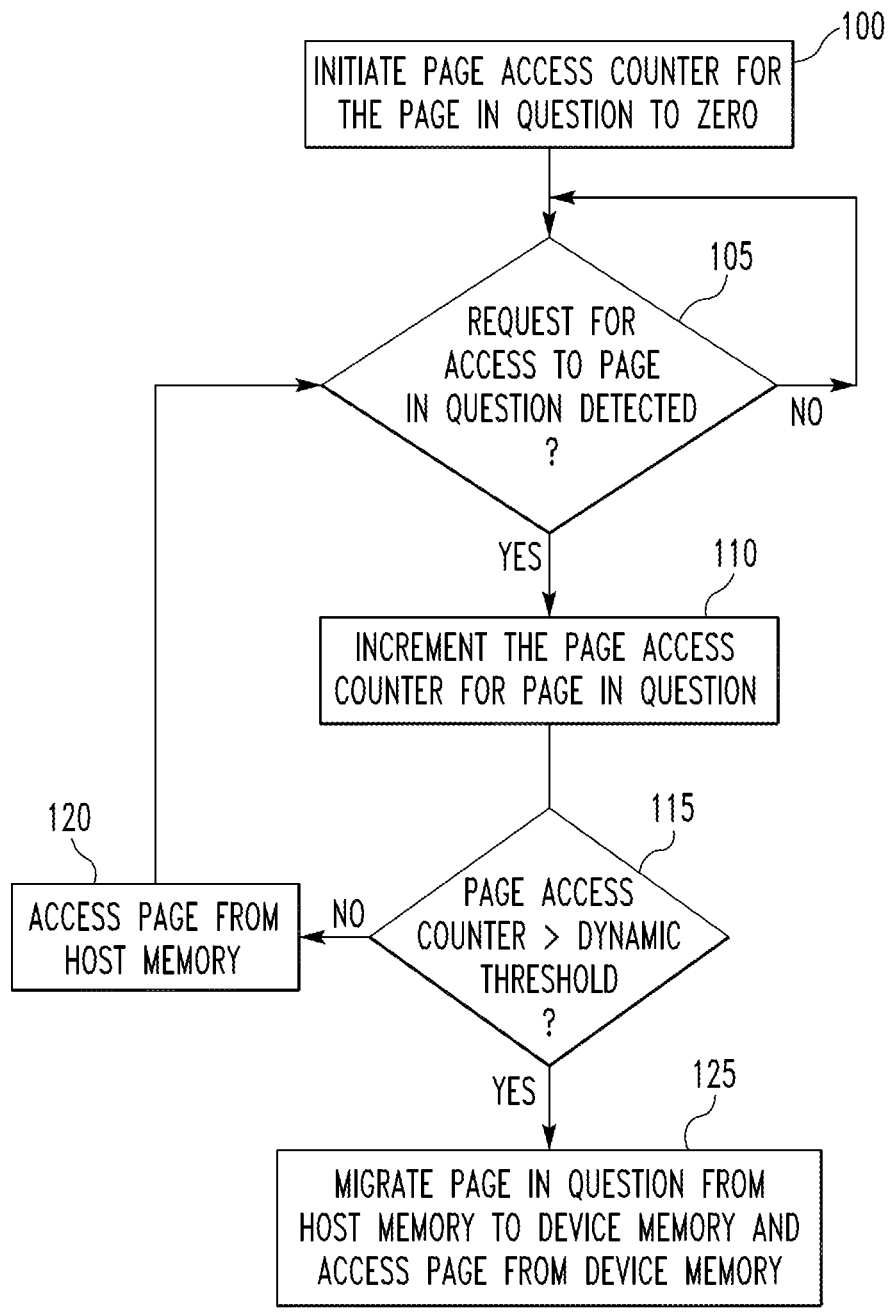
FIG. 4 is a flowchart illustrating a method of adaptively migrating and pinning pages for oversubscribed irregular applications according to an exemplary embodiment of the disclosed concept.

FIG. 4 is a flowchart illustrating a method of adaptively migrating and pinning pages for oversubscribed irregular applications according to an exemplary embodiment of the disclosed concept that may be implemented in any of the heterogeneous NUMA systems described herein. The method in FIG. 4 is, in the exemplary embodiment, executed by a driver or runtime that is hosted by one of the processing units of the heterogeneous NUMA system (e.g., the GPU driver or runtime). As will be appreciated, the method shown in FIG. 4 is performed for each page of data that is part of the working set of the irregular application in question. Thus, FIG. 4 illustrates the method for one such page.

As seen in FIG. 4, the method begins at step 100, wherein a page access counter is initialized to zero for the page in question. In the exemplary embodiment, the page access counter is a hardware-based access counter as described herein. Next, at step 105, a determination is made as to whether a request for access to the page in question is detected. If the answer is no, then the method simply returns to step 105 and continues to monitor for page access requests. If, however, the answer is yes at step 105, then the method proceeds to step 110. At step 110, the page access counter is incremented for the page in question (i.e., +1). Then, at step 115, a determination is made as to whether the page access counter for the page in question exceeds the dynamic threshold, $t_d$. The dynamic threshold, $t_d$, is determined dynamically in the manner described in detail above. If the answer is no at step 115, then the method proceeds to step 120, wherein the page in question is accessed from the host memory without migration. The method then returns to step 105 to monitor for further page requests. If, however, the answer is yes at step 115, then the method proceeds to step 125. At step 125, the page in question is migrated from the host memory to the device memory, and is then accessed from the device memory. During performance of the method of FIG. 4, the dynamic threshold, $t_d$, is calculated continuously/dynamically based on the parameters discussed in detail elsewhere herein.

The disclosed concepts thus introduces a programmer-agnostic, dynamic page placement strategy for irregular general purpose applications. The disclosed framework leverages hardware-based access counters to identify sparse and dense memory access and differentiate between hot and cold allocations. Over the course of execution, the framework achieves a balance between low latency remote access to host-pinned cold allocations and bandwidth-optimized local access to hot allocations in irregular applications with oversubscribed working sets. However, the framework does not affect regular applications and applications with working sets smaller than the device memory capacity. Experiments with a set of regular and irregular GPGPU applications demonstrate that the disclosed heuristic adaptively navigates the spectrum between zero-copy remote access and first-touch migration. A key contribution of the disclosed solution is leveraging existing system support to design such a developer-agnostic, adaptive framework. Specifically, the disclosed framework is not built on any new hardware modification and does not require any explicit user hints that are based on intrusive profiling of workloads to provide performance improvement for irregular applications under memory oversubscription. Moreover, the disclosed framework builds on generic concepts like zero-copy memory and delayed migration and thus can be adopted by any GPU irrespective of the vendor-specific architecture and runtime.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method of managing data during execution of an application in a system that includes a host memory, a near memory, and a near device associated with the near memory, wherein the application uses a working set of data that is distributed between a far memory and the near memory, the method comprising:

counting a number of times that the near device accesses a unit of the working set of data from the far memory;

determining whether the number of times exceeds a dynamically changing access counter threshold, wherein the dynamically changing access counter threshold is, in cases of no oversubscription of the near memory, calculated dynamically based on a static threshold that is set for the system and a current percentage occupancy of the near memory; and responsive to determining that the number of times exceeds the dynamically changing access counter threshold, migrating the unit of data from the far memory to the near memory.

2. The method according to claim 1, wherein the counting the number of times is performed by a hardware based access counter of the near device.

3. The method according to claim 1, wherein the application is on irregular application having unpredictable memory access.

4. The method according to claim 1, wherein the method is performed in a heterogeneous NUMA system that includes the near device in the form of a first processing unit coupled to the near memory, and wherein the first processing unit is configured to execute the application using the working set of data.

5. The method according to claim 4, wherein the near memory and the far memory are not provided on the same package and are connected by an off-package data-fabric.

6. The method according to claim 5, wherein the first processing unit is a massive thread-parallel accelerator.

7. The method according to claim 6, wherein the heterogeneous NUMA system is a CPU-GPU heterogeneous system and wherein the massive thread-parallel accelerator is a graphics processing unit (GPU).

8. The method according to claim 7, wherein the heterogeneous NUMA system includes a second processing unit in the form of a host central processing unit (CPU).

9. The method according to claim 8, wherein the off-package data-fabric is a PCIe interconnect.

10. The method according to claim 1, wherein the method is performed in a heterogeneous NUMA system, wherein the near memory is provided in a first package and the far memory is provided in a second package separate from the first package, and wherein the near memory and the far memory are connected by an off package data-fabric.

11. A method of managing data during execution of an application in a system that includes a host memory, a near memory, and a near device associated with the near memory, wherein the application uses a working set of data that is distributed between a far memory and the near memory, the method comprising:

counting a number of times that the near device accesses unit of the working set of data from the far memory;

determining whether the number of times exceeds a dynamically changing access counter threshold, wherein the dynamically changing access counter threshold is, in cases of oversubscription of the near memory, calculated dynamically based on a static threshold that is set for the system, a number of roundtrips of a given data size during the execution of the application, and a multiplicative migration penalty; and responsive to determining that the number of times exceeds the dynamically changing access counter threshold, migrating the unit of data from the far memory to the near memory.

12. The method according to claim 11, wherein the multiplicative migration penalty is a configurable parameter.

13. A method of managing data during execution of an application in a system that includes a host memory, a near memory, and a near device associated with the near memory, wherein the application uses a working set of data that is distributed between a far memory and the near memory, the method comprising:

counting a number of times that the near device accesses a unit of the working set of data from the far memory;

determining whether the number of times exceeds a dynamically changing access counter threshold, wherein the unit of the working set of data is a page, and wherein the dynamically changing access counter threshold ($t_d$) is determined based on the following equation:

$$t_d = \begin{cases} t_s * \frac{\text{Num. of allocated pages}}{\text{Total num. of pages}} + 1, & \text{if no oversubscription} \\ t_s * (r+1) * p, & \text{otherwise} \end{cases}$$

where $t_s$=a static threshold that is set for the system, $r$=a number of roundtrips of a given data size during the execution of the application, Num. of allocated pages is a number of pages allocated to the near device, Total num. of pages is the capacity of the near device, and $p$=a multiplicative migration penalty; and responsive to determining that the number of times exceeds the dynamically changing access counter threshold, migrating the unit of data from the far memory to the near memory.

14. A non-transitory computer readable medium storing one or more programs, including instructions, which when executed by a processor, causes the processor to perform the method of claim 1.

15. A system for executing an application, comprising:

a near device;

a near memory coupled to the near device; and a far memory coupled to the near memory;

wherein the near device is configured to execute the application using a working set of data in a condition where the working set of data is distributed between the near memory and the far memory, and wherein the system is configured for:

counting a number of times that the near device accesses a unit of the working set of data from the far memory;

determining whether the number of times exceeds a dynamically changing access counter threshold, wherein the dynamically changing access counter threshold is, in cases of no oversubscription of the near memory, calculated dynamically based on a static threshold that is set for the system and a current percentage occupancy of the near memory; and responsive to determining that the number of times exceeds the dynamically changing access counter threshold, migrating the unit of data from the far memory to the near memory.

16. The system according to claim 15, wherein the counting the number to times is performed by a hardware based access counter of the near device.

17. The system according to claim 15, wherein a capacity of the near memory is smaller than a size of the working set such that the entirety of the working set cannot fit in the near memory.

18. The system according to claim 15, wherein the application is an irregular application having unpredictable memory access.

19. The system according to claim 15, wherein the system is a heterogeneous NUMA system further comprising a host device, wherein the near memory and the far memory are not provided on the same package and are connected by an off-package data-fabric.

20. The system according to claim 19, wherein the near device is a massive thread-parallel accelerator.

21. The system according to claim 20, wherein the system is a CPU-GPU heterogeneous system, and wherein the massive thread-parallel accelerator is a graphics processing unit (GPU).

22. The system according to claim 20, wherein the off-package data fabric is a PCIe interconnect.

23. The system according to claim 15, wherein the system is a heterogeneous NUMA system, wherein the near memory is provided in a first package and the far memory is provided in a second package separate from the first package, and wherein the near memory and the far memory are connected by an on-package data-fabric.

24. A system for executing an application, comprising:
a near device;
a near memory coupled to the near device; and
a far memory coupled to the near memory;
wherein the near device is configured to execute the application using a working set of data in a condition where the working set of data is distributed between the near memory and the far memory, and wherein the system is configured for:
counting a number of times that the near device accesses a unit of the working set of data from the far memory;
determining whether the number of times exceeds a dynamically changing access counter threshold, wherein the dynamically changing access counter threshold is, in cases of oversubscription of the near memory, calculated dynamically based on a static threshold that is set for them system, number of roundtrips of a given data size during the execution of the application, and a multiplicative migration penalty; and
responsive to determining that the number of times exceeds the dynamically changing access counter threshold, migrating the unit of data from the far memory to the near memory.

25. The system according to claim 24, wherein the multiplicative migration penalty is a configurable parameter.

26. A system for executing an application, comprising:
a near device;
a near memory coupled to the near device; and
a far memory coupled to the near memory;
wherein the near device is configured to execute the application using a working set of data in a condition where the working set of data is distributed between the near memory and the far memory, and wherein the system is configured for:
counting a number of times that the near device accesses a unit of the working set of data from the far memory;
determining whether the number of times exceeds a dynamically changing access counter threshold, wherein the unit of the working set of data is a page, and wherein the dynamically changing access counter threshold ($t_d$) is determined based on the following equation:

$$t_d = \begin{cases} t_s * \dfrac{\text{Num. of allocated pages}}{\text{Total num. of pages}} + 1, & \text{if no oversubscription} \\ t_s * (r+1) * p, & \text{otherwise} \end{cases}$$

where $t_s$=a static threshold that is set for the system, r=a number of roundtrips of a given data size during the execution of the application, Num. of allocated pages is a number of pages allocated to the near device, Total num. of pages is the capacity of the near device, and p=a multiplicative migration penalty; and
responsive to determining that the number of times exceeds the dynamically changing access counter threshold, migrating the unit of data from the far memory to the near memory.

27. An apparatus for use in a system for executing an application, wherein the application uses a working set of data, and wherein the working set of data is distributed between a near memory and a far memory that are coupled to one another, the apparatus comprising:
a processing unit configured to: (i) count a number of times that a near device accesses a unit of the working set of data from the far memory; (ii) determine whether the number of times exceeds a dynamically changing access counter threshold wherein the dynamically changing access counter threshold is, in cases of no oversubscription of the near memory, calculated dynamically based on a static threshold that is set for the system and a current percentage occupancy of the new memory; and (iii) responsive to determining that the number of times exceeds the dynamically changing access counter threshold, migrate the unit of data from the far memory to the near memory.

28. The apparatus according to claim 27, wherein the processing unit configured is configured for counting the number to times using a hardware based access counter of the near device.

29. An apparatus for use in system for executing an application, wherein the application uses a working set of data, and wherein the working set of data is distributed between a near memory and a far memory that are coupled to one another, the apparatus comprising:
a processing unit configure to: (i) count a number of times that a near device accesses a unit of the working set of data from the far memory; (ii) determine whether the number of times exceeds a dynamically changing access counter threshold, wherein the dynamically changing access counter threshold is, in cases of oversubscription of the near memory, calculated dynamically based on a static threshold that is set for the system, a number of roundtrips of a given data size during the execution of the application, and a multiplicative migration penalty; and (iii) responsive to determining that the number of times exceeds the dynamically changing access counter threshold, migrate the unit of data from the far memory to the near memory.

30. The apparatus according to claim 29, wherein the multiplicative migration penalty is a configurable parameter.

31. An apparatus for use in a system for executing an application, wherein the application uses a working set of data, and wherein the working set of data is distributed between a near memory and a far memory that are coupled to one another, the apparatus comprising:
a processing unit configured to: (i) count a number of times that a near device accesses a unit of the working set of data from the far memory; (ii) determine whether the number of times exceeds a dynamically changing access counter threshold, wherein the unit of the working set of data is a page, and wherein the dynamically changing access counter threshold ($t_d$) is determined based on the following equation:

$$t_d = \begin{cases} t_s * \dfrac{\text{Num. of allocated pages}}{\text{Total num. of pages}} + 1, & \text{if no oversubscription} \\ t_s * (r+1) * p, & \text{otherwise} \end{cases}$$

where $t_s$=a static threshold that is set for the system, $r$=a number of roundtrips of a given data size during the execution of the application, Num. of allocated pages is a number of pages allocated to the near device, Total num. of pages is the capacity of the near device, and =a multiplicative migration penalty; and (iii) responsive to determining that the number of times exceeds the dynamically changing access counter threshold, migrate the unit of data from the far memory to the near memory.

* * * * *

UNITED STATES PATENT AND TRADEMARK OFFICE
CERTIFICATE OF CORRECTION

PATENT NO. : 11,893,266 B2
APPLICATION NO. : 17/604975
DATED : February 6, 2024
INVENTOR(S) : Debashis Ganguly et al.

It is certified that error appears in the above-identified patent and that said Letters Patent is hereby corrected as shown below:

In the Claims

Column 15, Claim 11, Line 49, the word --a-- is missing before the word "unit".

Column 17, Claim 24, Line 34, the word --a-- is missing before the word "number".

Column 18, Claim 29, Line 1, the word --a-- is missing before the word "system".

Column 19, Claim 31, Line 11, --p-- is missing before "=a".

Signed and Sealed this
Fourth Day of June, 2024

Katherine Kelly Vidal
*Director of the United States Patent and Trademark Office*